United States Patent
Raslan et al.

(10) Patent No.: US 12,443,425 B1
(45) Date of Patent: Oct. 14, 2025

(54) ISOLATED ACCELERATOR MANAGEMENT INTERMEDIARIES FOR VIRTUALIZATION HOSTS

(71) Applicant: Amazon Technologies, Inc., Seattle, WA (US)

(72) Inventors: Karimallah Ahmed Mohammed Raslan, Leander, TX (US); Rolf Peter Neugebauer, Cambridge (GB); Ioannis Aslanidis, Berlin (DE); Filippo Sironi, Dresden (DE); Jan Hendrik Schoenherr, Dresden (DE); Milan Pandurov, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 879 days.

(21) Appl. No.: 17/535,922

(22) Filed: Nov. 26, 2021

(51) Int. Cl.
G06F 9/455 (2018.01)
G06F 9/445 (2018.01)

(52) U.S. Cl.
CPC ...... G06F 9/45558 (2013.01); G06F 9/44594 (2013.01); *G06F 2009/45579* (2013.01); *G06F 2009/45587* (2013.01)

(58) Field of Classification Search
CPC .............. G06F 9/45558; G06F 9/44594; G06F 2009/45579; G06F 2009/45587
See application file for complete search history.

(56) References Cited

U.S. PATENT DOCUMENTS

| | | | |
|---|---|---|---|
| 10,127,068 B2 | 11/2018 | Liguori et al. | |
| 10,318,311 B2 | 6/2019 | Liguori et al. | |
| 10,318,737 B2 | 6/2019 | Liguori et al. | |
| 10,776,142 B1* | 9/2020 | Seshadri | G06F 9/44505 |
| 12,047,245 B2* | 7/2024 | Singh | H04W 28/0865 |
| 2013/0080567 A1* | 3/2013 | Pope | G06Q 40/04 709/213 |
| 2015/0042664 A1* | 2/2015 | Currid | G09G 5/363 345/520 |
| 2018/0335956 A1* | 11/2018 | Iyer | G06F 3/067 |
| 2021/0382737 A1* | 12/2021 | Cheng | G06F 9/45558 |
| 2022/0311594 A1* | 9/2022 | Kadam | H04L 9/40 |

OTHER PUBLICATIONS

Oracle, Oracle VM Server for SPARC 2.2 Administration Guide: Using PCIe SR-IOV Virtual Functions, 2007, <https://docs.oracle.com/cd/E35434_01/html/E23807/usingsriov.html#>, pp. 1-8 (Year: 2007).*
U.S. Appl. No. 16/285,086, filed Feb. 25, 2019, Atul Khare, et al.
U.S. Appl. No. 16/368,747, filed Mar. 28, 2019, Anthony Nicholas Liguori, et al.

* cited by examiner

*Primary Examiner* — Aimee Li
*Assistant Examiner* — Hsing Chun Lin
(74) *Attorney, Agent, or Firm* — Robert C. Kowert; Kowert, Hood, Munyon, Rankin & Goetzel, P.C.

(57) ABSTRACT

An isolated accelerator management intermediary running at a virtualization host uses a management interface exposed by a hardware accelerator to perform a set of operations to enable access to the hardware accelerator from a guest virtual machine. The operations include configuring a guest-accessible interface of the accelerator. A virtualization management component of the host launches the guest virtual machine after the set of operations is completed.

20 Claims, 11 Drawing Sheets

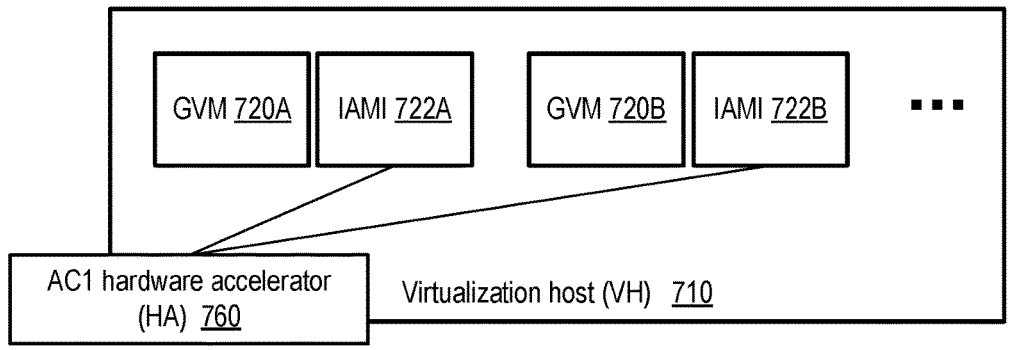
Configuration option B: VH has N accelerators of category AC1, one IAMI per GVM
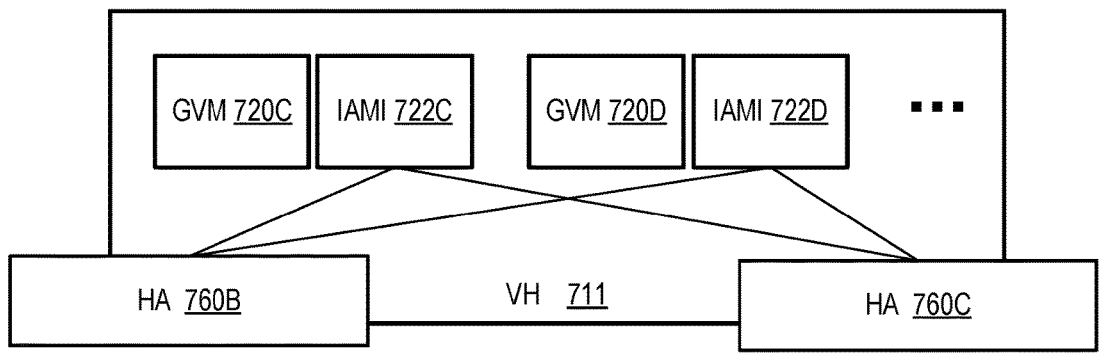
Configuration option C: VH has N accelerators of category AC1, single IAMI for all GVMs
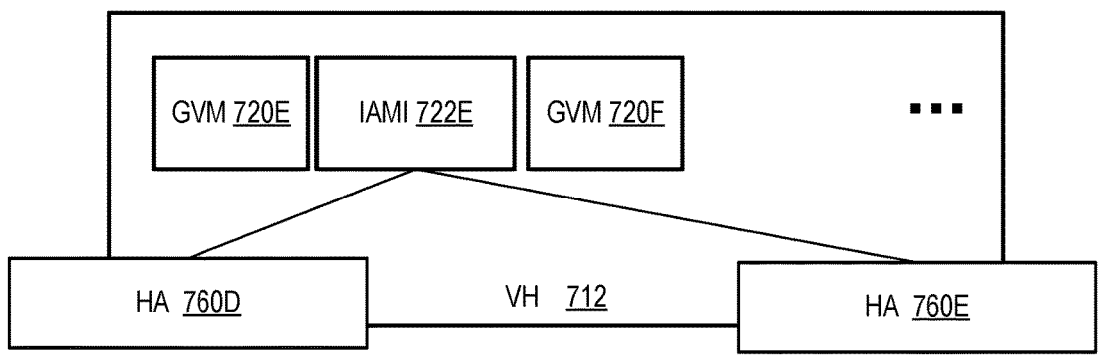
FIG. 7

Configuration option D: VH has N1 accelerators of category AC1, N2 accelerators of category AC2; one IAMI per GVM per accelerator category
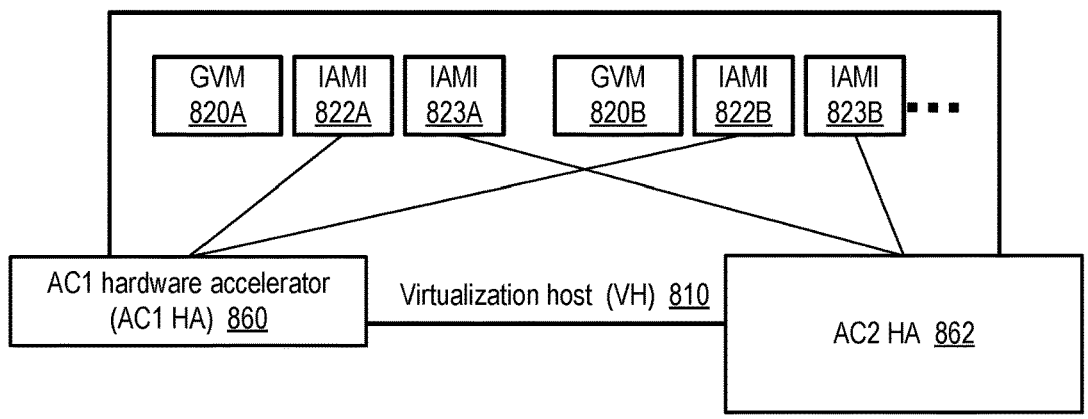
Configuration option E: VH has N1 accelerators of category AC1, N2 accelerators of category AC2; one IAMI per GVM handles all accelerators used by that GVM
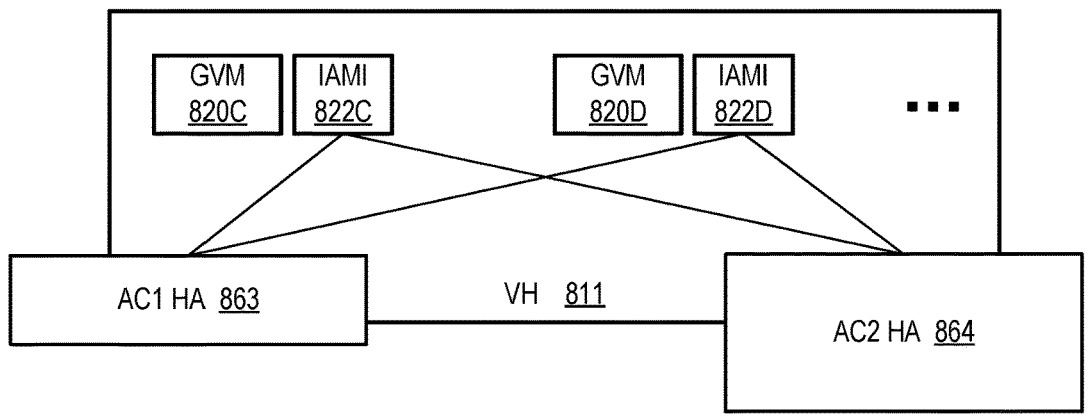
FIG. 8

A programmatic request is received from a client of a VCS, requesting a GVM (compute instance) with access to a hardware accelerator of category AC1  1001

The VCS control plane selects a virtualization host VH1 with an accelerator HA1 of category AC1 and sends an internal request to launch a GVM to a virtualization management component VMC1 (such as a hypervisor) at VH1  1004

VMC1 verifies that an isolated accelerator management intermediary (IAMI) for HAs of category AC1 has been configured or is running at VH1 (e.g., by launching the IAMI itself using a special-purpose machine image); the IAMI may comprise a user-mode process with permission to access a management interface of HA1, may only communicate with VMC1 via a secure channel dedicated for accelerator management traffic, and may not be able to access memory and other resources used by VMC1 for its virtualization-related tasks  1007

IAMI performs operations to enable access from a GVM to HA1 using a guest-accessible interface (e.g., by initializing HA1's state and creating an SR-IOV VF associated with HA1's PF) and informs VMC1 that the operations have completed successfully  1010

VMC1 launches the requested GVM, changing its configuration settings if needed so that it can access HA1 via the guest-accessible interface  1013

Requests for acceleration operations are transmitted to HA1 from the GVM, and results are obtained at the GVM, via the guest-accessible interface; metrics collected from HA1 by the IAMI may be provided via VMC1 to the client upon request.  1016

FIG. 10

ISOLATED ACCELERATOR MANAGEMENT INTERMEDIARIES FOR VIRTUALIZATION HOSTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. Increasing customer demand for support of specialized applications (such as machine learning applications, video processing and the like) that benefit from hardware accelerators has led to the introduction of new types of guest virtual machines at virtualized computing services.

BRIEF DESCRIPTION OF DRAWINGS

FIG. 7 and FIG. 8 collectively illustrate example configuration options for providing access to hardware accelerators at virtualization hosts using isolated accelerator management intermediaries, according to at least some embodiments.

FIG. 10 is a flow diagram illustrating aspects of operations which may be performed to launch a guest virtual machine at a virtualization host equipped with a hardware accelerator, according to at least some embodiments.

Figure 1:
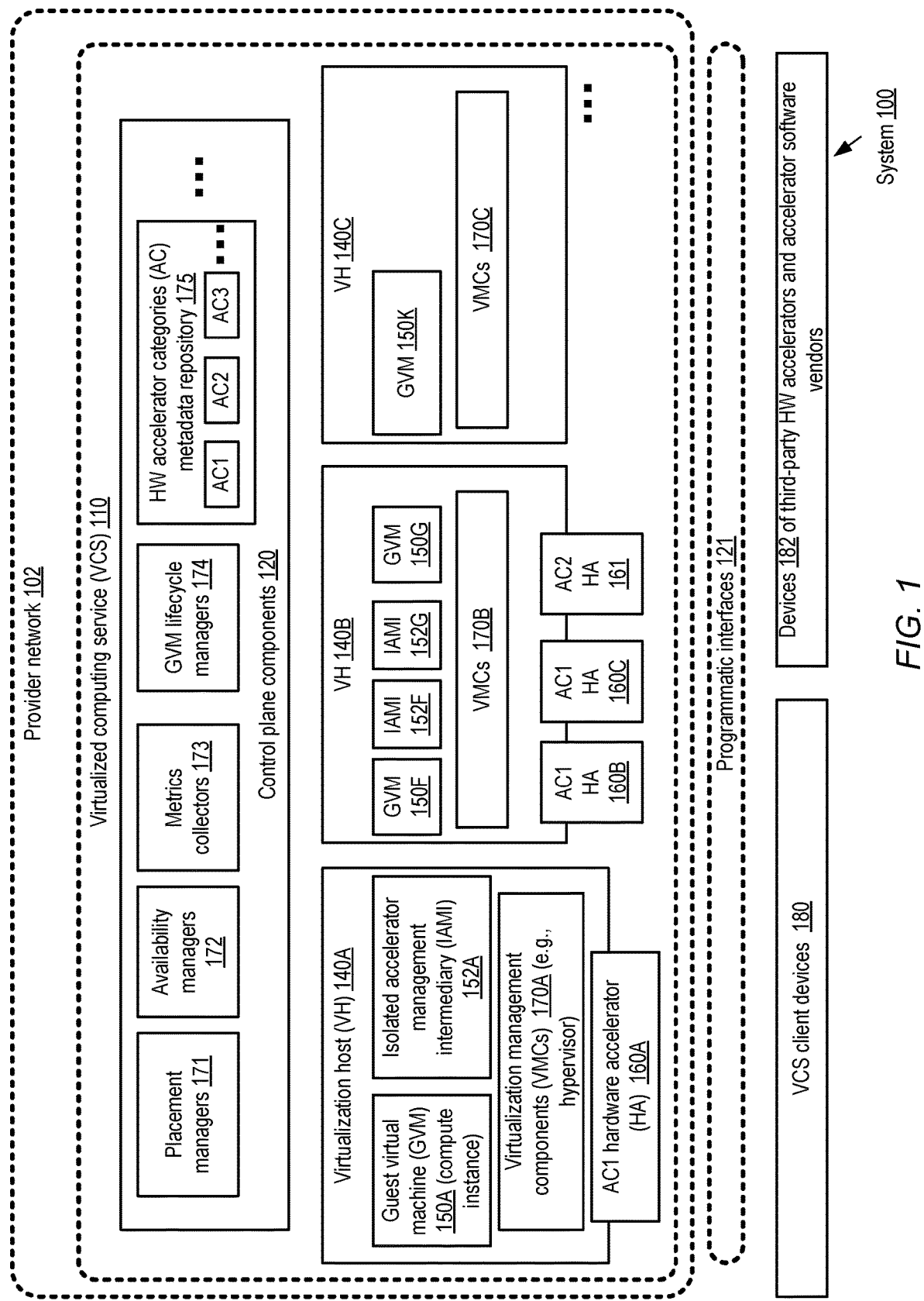
FIG. 1 illustrates an example system environment in which isolated accelerator management intermediaries may be executed at virtualization hosts of a computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for configuring and deploying isolated accelerator management intermediaries (IAMIs) at virtualization hosts of a computing service which are equipped with special-purpose hardware accelerators. The accelerators may for example include devices optimized for tasks such as video transcoding, machine learning model training, or executing graphics applications, as well as customizable devices such as field-programmable gate arrays (FPGAs). Clients of the computing service can choose the types of guest virtual machines (GVMs) or compute instances they wish to acquire from a catalog of supported GVM types that include GVMs with access to such hardware accelerators. Accelerators developed by numerous third-party vendors can be utilized from GVMs configured at a virtualized computing service of a provider network or cloud computing environment. In many cases, vendor-provided low-level software is used for controlling and configuring an accelerator (e.g., initializing the accelerator, terminating operations at the accelerators, monitoring the state of the accelerator, or clearing contents of memory of the accelerators).

In order to ensure that hypervisors and other virtualization management components (VMCs) used at a virtualization host, as well as GVMs run at the host, are protected from potential interference or attacks from such vendor-provided software (which can potentially be caused by bugs in the vendor-provided software, for example), the vendor-provided software is run in an isolated user-mode execution environment referred to as an IAMI. An IAMI can itself comprise a special-purpose virtual machine whose only responsibilities are to perform a restricted set of accelerator configuration tasks in response to commands issued by the VMCs via a secure communication channel. The tasks performed at an IAMI, which can access and use the management interface of an accelerator, can include the configuration or creation of guest-accessible interfaces (e.g., single root input/output virtualization [SR-IOV] virtual functions [VFs]) which can be used by programs running at GVMs to request execution of tasks at the accelerator and receive results of the tasks from the accelerator. An IAMI is not granted access to virtualization host memory which is assigned for use by the VMCs or assigned for use by GVMs, and thus cannot access any data structures used by the VMCs or GVMs. The only communication permitted to or from the IAMI (other than communication with the accelerator) is via the secure channel set up between the IAMI and a VMC, and the only types of messages that can be sent successfully via the secure channel are messages that belong to a category of messages for requesting accelerator configuration operations and providing results of the accelerator configuration operations; any other types of messages are rejected by the VMC. By thus isolating the low-level software used for accelerator configuration tasks, the security of GVMs and other components of the virtualization host is enhanced, and the operator of the computing service can safely continue to use the vendor-provided software without having to incorporate the vendor-provides software within the VMCs. Furthermore, the logical separation or isolation of the VMCs from the software used for accelerator configuration enables software updates for the VMCs to be applied independently of software updates to the accelerator configuration software, which can help speed up software development/deployment timelines.

Before a VMC launches a GVM requested by a client at an accelerator-equipped virtualization host, the VMC ensures than an IAMI which can be used to perform accelerator configuration operations on behalf of the GVM is running at the virtualization host. In some cases, a respective IAMI can be launched by the VMC for each GVM as part of the GVM launch workflow performed in response to a client's request for a GVM. When a client issues a command to terminate a GVM running at an accelerator-equipped host, a VMC at that host ensures that the GVM process exits before terminating (if needed) an IAMI which was used on behalf of the terminated GVM. Metrics collected from the accelerator by the IAMI can be presented to the client upon request.

As one skilled in the art will appreciate in light of this disclosure, certain embodiments may be capable of achieving various advantages, including some or all of the following: (a) enhancing the security of virtualization management components and guest virtual machines run at computing services which support access to special-purpose hardware accelerators from the guest virtual machines, (b) reducing the overall amount of computing resources needed for developing and testing the virtualization management components, compared for example to scenarios in which the low-level software used for configuring the accelerators is incorporated within the virtualization management components, (c) enabling new types of hardware-accelerated applications to be rolled out more quickly at provider network computing services and/or (d) enabling updates of virtualization management components to be rolled out independently of updates to accelerator management software.

Access from GVMs running at virtualization hosts to many different categories of hardware accelerators, each designed and optimized to accelerate one or more types of tasks or computations, may be supported at a virtualized computing service (VCS) of a provider network or cloud computing environment in various embodiments. According to some embodiments, a system may comprise one or more control plane servers (CPSs) and a virtualization host (VH) of such a VCS. The VH may comprise a hardware accelerator (HA) of a particular category of accelerators, and a set of virtualization management components such as a hypervisor A CPS may receive a programmatic request from a VCS client for a guest virtual machine (GVM) which has access to an HA of the particular category, and transmit a GVM launch request to a VMC at the VH. The VMC may verify, prior to a launch of the requested GVM at the virtualization host in response to the launch request from the control plane server, that an isolated accelerator management intermediary (IAMI) associated with the HA is running at the VH. In at least some embodiments the IAMI may comprise a user-mode process (e.g., a virtual machine launched using a machine image from which at least some components not required for accelerator configuration and management have been removed) with permission to access a management interface exposed by the hardware accelerator. In an embodiment in which the VMCs emulate a set of devices for GVMs (e.g., input/output devices and the like), at least some of the devices that are emulated for a GVM may not be emulated for the virtual machine used for the IAMI. The IAMI may be permitted to or configured to communicate with the VMC via a secure channel restricted to transmission of messages pertaining to accelerator management in some embodiments, and the IAMI may not have permission to access at least a portion of memory which is used by the VMC. In at least some embodiments, an IAMI may be configured in such a way that the only entities it can communicate with are the accelerator and the VMC; over-the wire network communication to/from the IAMI may not be permitted, and I/O to at least some persistent storage devices of the VH may not be permitted.

The VMC may send one or more messages via the secure channel, which cause the IAMI to perform, using the management interface exposed by the hardware accelerator, a set of operations to enable access to the hardware accelerator from a GVM in various embodiments. In other embodiments, the IAMI may be programmed to perform the set of operations automatically, e.g., when the IAMI starts up, without receiving a message via the secure channel. The set of operations may include initializing the hardware accelerator and configuring a guest-accessible interface of the hardware accelerator in one embodiment. After the VMC confirms that the set of operations was performed by the IAMI (e.g., as indicated in a message from the IAMI, received via the secure channel), the VMC may launch the requested GVM in various embodiments. In some embodiments, the VMC may modify configuration settings of the GVM to enable programs running at the GVM (e.g., including the GVM's own drivers for the accelerator) to access the hardware accelerator via the guest-accessible interface. Programs running at the GVM may then use the guest-accessible interface to submit task requests to the hardware accelerator and receive corresponding results.

In some embodiments, the hardware accelerator may be attached or linked to the primary processors (e.g., CPUs) of the virtualization host via a peripheral interconnect such as a Peripheral Component Interconnect-Express (PCIe) interconnect or a Compute Express Link (CEI) interconnect. Various categories of HAs may be used in different embodiments for different types of tasks, such as accelerators comprising video transcoders, graphics processors or GPUs (graphics processing units), machine learning task processors, and/or FPGAs. In some embodiments, the guest-accessible interface may be an SR-IOV (single-root input/output virtualization) interface such as a virtual function or a physical function associated with the HA.

The number of IAMIs that are launched at a given accelerator-equipped VH may vary in different implementations, depending on factors such as the number and categories of accelerators at the VH, the number of GVMs launched at the VH, and so on. In one embodiment, a given HA may only be used by a single GVM, a VMC may launch a respective IAMI for each GVM prior to the launch of the GVM, and the IAMI and the GVM may both be terminated when a request to terminate the GVM is received. In another embodiment, multiple HAs of a given category may be managed with the help of a single IAMI-that is, the IAMI may initialize each of the HAs upon receiving respective requests/commands from the VMC, set up guest-accessible interfaces of each HA for use by multiple GVMs, and so on. In some embodiments a given VH may comprise HAs of several different categories (e.g., HAs provided by respective vendors for performing the same type of task, or HAs designed to perform different types of tasks), and a separate IAMI may be launched for configuring each category of HA. Each category of HA may expose a different management interface, which may be used by the category-specific IAMI to configure one or more HAs of that category in such embodiments. In another embodiment, a given IAMI may perform configuration operations of HAs of two or more categories. In at least some embodiments, when a GVM with an associated IAMI (which was only being used for that GVM) is to be terminated in response to a client request, the IAMI may remain running until the GVM has terminated, after which the IAMI may itself be terminated. If an IAMI is being used for multiple GVMs, in some embodiments the IAMI may not be terminated until all the GVMs for which it was being used have themselves terminated.

In various embodiments, an IAMI may monitor the state (e.g., device temperature, operational status of components, responsiveness of the accelerator, records of task requests and completions, etc.) of one or more HAs, and collect metrics (such as the number of GVM-requested operations requested and successfully completed, the number of GVM-requested operations requested that failed or had to be retried, utilizations of processing elements and memory of the accelerators) of one or more HAs via the management interfaces of the HAs. Such metrics may be obtained at VMCs via the secure channel configured between the VMCs and the IAMI, and provided to clients upon request.

As mentioned above, in at least some embodiments a VCS at which IAMIs of the kind described above are used may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include, in addition to a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which isolated accelerator management intermediaries may be executed at virtualization hosts of a computing service, according to at least some embodiments. As shown, system 100 includes a provider network 102 at which a number of network-accessible services including virtualized computing service (VCS) 110 may be implemented. The VCS 110 includes control plane components 120 and a plurality of virtualization hosts (VHs) 140 at which guest virtual machines (GVMs) or compute instances are run on behalf of VCS clients. At least some of the VHS 140 may comprise hardware accelerators for operations of a variety of applications such as video processing/distributing applications, machine learning applications, and the like. In the depicted embodiment, the control plane components 120 may comprise one or more placement managers 171 (responsible for selecting and configuring specific virtualization hosts for GVMs based on the clients' computational requirements or requests), availability managers 172 (responsible for implementing policies to keep client-facing VCS functionality up and running in the event of failures of various kinds), metrics collectors 173 responsible for collecting various metrics from other subcomponents such as the VHs an initiating actions (such as provisioning additional VHs) based on the collected metrics, GVM lifecycle managers 174 (responsible for orchestrating the launches and terminations of GVMs in response to client requests) and a metadata repository 175 at which information about supported hardware accelerator categories (ACs) and the specific hosts at which the accelerators are available may be stored. For example, accelerators belonging to categories AC1, AC2 and/or AC3 may be available at a respective subset of the VHs of the VCS 110, and metadata repository 175 may include an inventory of the specific VHs which have accelerators of each of the categories. The accelerator categories may differ from one another along various dimensions such as the specific type of operations or tasks which are accelerated, the vendors who provide the accelerators and/or associated software, the performance capabilities of the accelerators, power consumption levels, the physical sizes of the accelerators, the interconnects used for attaching the accelerators to VHs, and so on. Individual ones of the control plane components 120 may be implemented using a combination of software and hardware of one or more computing devices or servers in various embodiments.

As shown, the VCS 110 includes a plurality of virtualization hosts (VHs) 140 in the depicted embodiment, including VHs 140A, 140B and 140C. Each of the virtualization hosts may have the capacity to support one or more guest virtual machines (GVMs) 150 on behalf of one or more clients. For example, GVM 150A runs on VH 140A which is equipped with a hardware accelerator 160A of category AC1. GVM 150F and GVM 150G run on VH 140B, which has AC1 hardware accelerators 160B and 160C, as well as AC2 accelerator 161. VH 140C includes GVM 150K and does not have any hardware accelerators in the example scenario shown in FIG. 1. In general, a given VH may comprise zero or more hardware accelerators, and zero or more GVMs may be running at the VH at a particular point in time. Individual ones of the VHs may include respective virtualization management components (VMCs) 170 in the depicted embodiment, such as VMCs 170A at VH 140A, VMCs 170B at VH 140B, and VMCs 170C. Generally speaking, VMCs 170 may include hypervisors, administrative-domain operating systems, and/or hardware peripheral devices that implement portions of the virtualization logic. In at least some embodiments, a number of different types of hardware servers may be used as virtualization hosts, and a number of different categories of GVMs may be supported (e.g., with some types of hardware servers being devoted exclusively to a subset of the GVM categories). The different categories of GVMs may differ from one another in various characteristics such as the kinds of applications for which they are optimized, their performance capabilities, the level of availability or fault tolerance, the security policies implemented, and so on. Examples of GVM categories are discussed below in the context of FIG. 6.

In various embodiments, any appropriate interconnects such as expansion buses compliant with one or more versions of the PCIe standard, a Compute Express Link interconnect standard, a USB (Universal Serial Bus) standard, Ethernet and the like may be used for attaching the hardware accelerators at the virtualization hosts. In some embodiments, all the virtualization hosts of the VCS may be equipped with at least one hardware accelerator 160. In other embodiments, a subset of the VCS's virtualization hosts may not have hardware accelerators.

The VCS may implement a set of programmatic interfaces 121 which can be used by VCS clients and third-party vendors of accelerator hardware or software to communicate with the VCS in the depicted embodiment. Programmatic interfaces 121 may for example include one or more web-based consoles, command-line tools, graphical user interfaces, and/or a set of application programming interfaces. VCS clients may submit messages or requests to the VCS via the interfaces 121 from a variety of client devices 180. Third-party vendors (e.g., entities other than the operator of the VCS and other than VCS clients who wish to acquire and use GVMs) may provide software programs that can be used to help control and manage hardware accelerators, as well as updates to such software programs when available, via the programmatic interfaces 121 from other client devices 182. Client devices 180 and 182 may each comprise laptops, desktops, mobile computing devices and the like in different embodiments.

In the embodiment depicted in FIG. 1, one or more isolated accelerator management intermediaries (IAMIs) 152, such as IAMI 152A at VH 140A and IAMIs 152F and 152G at VH 140B, may be run at VHs equipped with certain categories of hardware accelerators. An IAMI may, for example, comprise a special-purpose virtual machine launched by the VMCs of the VH in some embodiments. An IAMI may comprise driver software provided by one or more third-party vendors for one or more categories of hardware accelerator(s) in one embodiment. A given driver, comprising one or more processes or threads of execution running in user mode, may access a management interface of a hardware accelerator to perform such actions as initializing or rebooting the accelerator, clearing or scrubbing memory of the accelerator, monitoring the state of the accelerator, collecting metrics from the accelerator, and so on. Such actions may be initiated by the IAMI in response to command or requests issued by the VMCs in at least some embodiments. An IAMI may be restricted in the kinds of operations it is allowed to perform, and the manner in which it can communicate with other programs or entities in the depicted embodiment. The IAMI may only perform accelerator configuration or administration tasks in various embodiments, and may only communicate with VMCs using secure channels of communication. The kinds of messages an IAMI can send or receive may be limited to a small category of permitted message types, pertaining to accelerator configuration-related operations; if an IAMI attempts to transmit any other type of message, that message may be rejected by the VMCs with which it is permitted to communicate. In at least some embodiments, an IAMI may comprise a virtual machine, launched by the VMCs using a machine image from whose operating system various types of components that are not required for accelerator management have been removed or stripped. One or more devices that are normally emulated for GVMs may not be emulated by the VMCs for IAMIs in at least some embodiments.

In various embodiments, the VCS 110 may provide a catalog of different GVM categories that can be requested by a VCS client via programmatic interfaces 121, including categories providing access to accelerators of one or more categories such as AC1, AC2 or AC3. A VCS client's request to obtain a GVM of a particular category may be received at the VCS control plane. There, depending on the category and on factors such as the current level of resource utilization at the different VHs available, a particular VH 140 may be selected to run the requested GVM. A control plane server such as a GVM lifecycle manager may transmit an internal request to launch the requested GVM to the VMCs at the selected GVM. For example, in response to a client's request for a GVM from which an AC1 hardware accelerator can be accessed and used, a request to launch the GVM may be sent from the VCS control plane to VMCs 170A at VH 140A (or to VMCs 170B at VH 140B).

The VMCs that receive a request for a GVM with access to a hardware accelerator may first verify that an IAMI for that category of accelerator is running on the VH in the depicted embodiment. As mentioned above, such an IAMI may comprise a user-mode process with permission to access a management interface (e.g., a low-level programmatic interface for administrative commands) exposed by the hardware accelerator. In some embodiments, the IAMI may be launched by the VMCs prior to the launch of the requested GVM, as the IAMI may have to prepare the accelerator for use by the GVM. The VMCs may communicate with the IAMI via a highly restricted secure communication channel, such as a channel using a buffer of memory of the virtualization host or a channel utilizing virtual sockets (e.g., via techniques similar to those used for virtio-vsock modules). The IAMI may not be granted access to memory used by the VMCs, or to memory used by any of the GVMs run on the VH in various embodiments.

Using the secure channel, the VMCs may send a command or request to the IAMI to perform one or more preparatory operations prior to the use of the hardware accelerator by the requested GVM. These preparatory operations may, for example, include initializing the accelerator's state (e.g., by performing the equivalent of a reboot of the accelerator), as well as configuring a guest-accessible interface which can later be used to submit requests for acceleration operations from the GVM to the accelerator. To perform at least some of the preparatory operations, the IAMI may utilize the management interface of the accelerator in various embodiments. In some embodiments, the guest-accessible interface may be an SR-IOV interface such as one or more PFs (physical functions) or VFs (virtual function). After the preparatory operations are completed by the IAMI and the VMCs determine that the preparatory operations have succeeded, the VMCs may launch the requested GVM in various embodiments. The VMCs may update one or more configuration settings of the GVM to enable the guest-accessible interface to be utilized from the GVM. Programs running at the GVM, such as another driver for the accelerator, may then submit requests for acceleration operations or tasks to the hardware accelerator using the guest-accessible interface, and receive corresponding responses or results in various embodiments.

In at least some embodiments, as mentioned above, a peripheral interconnect such as PCIe may be used to attach a hardware accelerator to the other components of a VH. Accelerators of several different categories may be utilized at VHs of the VCS in different embodiments, such as video transcoders, graphics program accelerators, machine learning task accelerators, FPGAs and the like. In some cases, as in the case of VH 140B, accelerators of several categories (such as AC1 and AC2) may be attached to the same VH. In some cases, multiple accelerators of the same category may be attached to a given VH, as also exemplified by VH 140B which has two AC1 accelerators. The mappings between accelerators, GVMs and IAMIs (e.g., whether a given GVM which accesses accelerators of two categories requires one IAMI or two IAMIs) may vary in different embodiments. A number of alternatives for configuring IAMIs are discussed in further detail below in the context of FIG. 7 and FIG. 8. In some cases, a given accelerator may be used in multi-tenant mode—i.e., the accelerator may perform tasks requested from several different GVMs at the VH. In other embodiments, a given accelerator may be configured in single-tenant mode; that is, it may respond to task requests from a single GVM. Similarly, IAMIs may be configured in single tenant mode in some embodiments and in multi-tenant mode in others. In single tenant mode, a given IAMI may only be utilized on behalf of one GVM, while in multi-tenant mode, a given IAMI may be used for configuration tasks associated with multiple GVMs. In some embodiments, a client may indicate tenancy requirements or preferences for accelerators in their requests to the VCS—e.g., a client may request a GVM which has access to a single-tenant accelerator. In at least one embodiment, a client may indicate that any software associated with an accelerator be used in single tenant mode, in which case a single-tenant IAMI may be used for that client by the VCS. An IAMI may collect various types of metrics from a hardware accelerator associated with it, and provide the metrics to the VMCs. The VMCs in turn may present the metrics to VCS clients via programmatic interfaces upon request.

Figure 2:
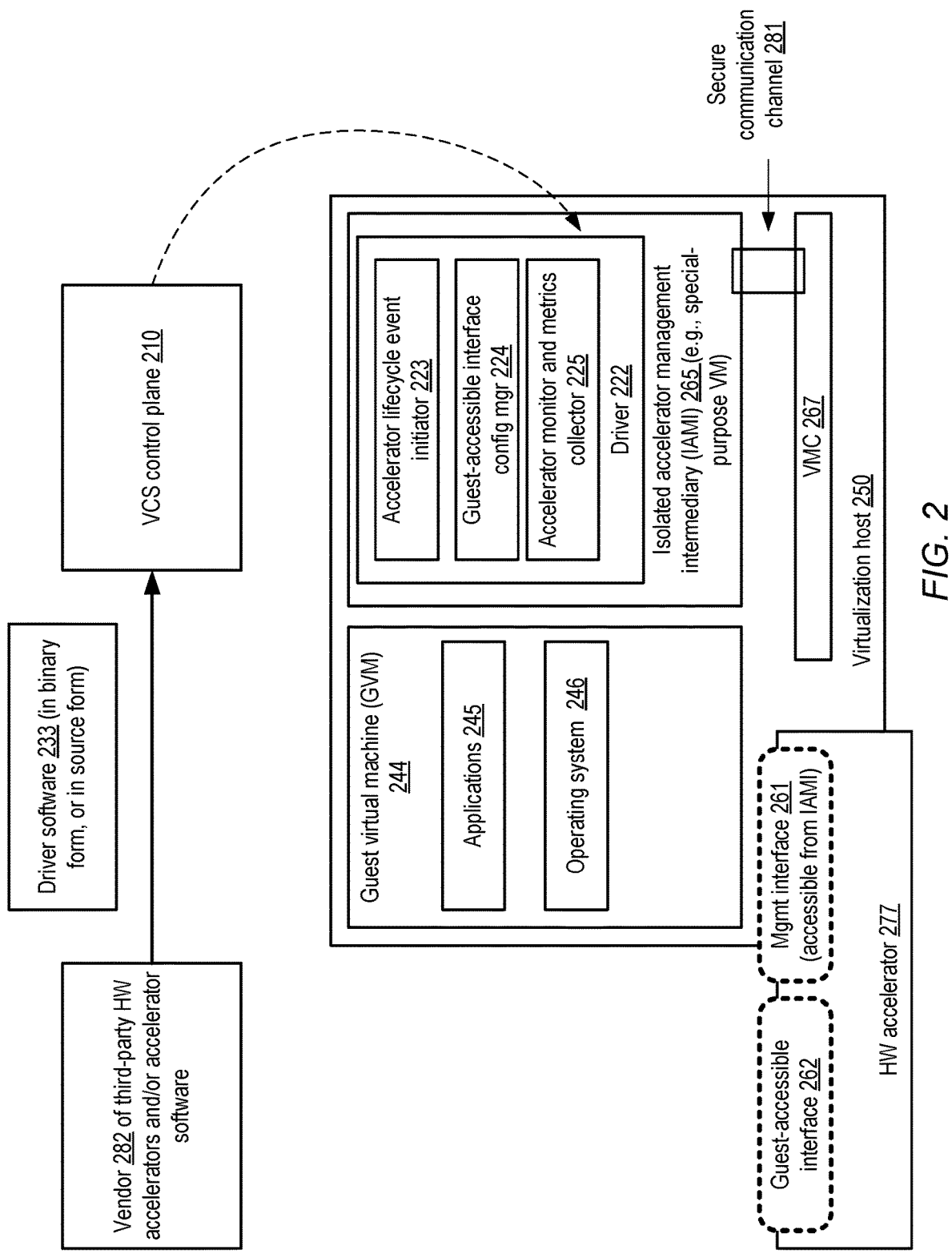
FIG. 2 illustrates an example scenario in which driver software, provided by a third-party vendor, may be utilized within an isolated accelerator management intermediary at a virtualization host of a computing service, according to at least some embodiments.

FIG. 2 illustrates an example scenario in which driver software, provided by a third-party vendor, may be utilized within an isolated accelerator management intermediary at a virtualization host of a computing service, according to at least some embodiments. Some of the hardware accelerator devices used at a VCS similar to VCS 110 of FIG. 1 may be developed by third-party vendors, and software that can access management interfaces of such accelerators may be developed and maintained by the third-party vendors or affiliated third-party software providers. In the embodiment depicted in FIG. 2, a vendor 282 of third-party accelerators or accelerator software may transmit driver software 233, e.g., either in binary/executable format or in source code format to a VCS control plane component via a programmatic interface.

At the VCS, an executable version of the driver 222 may be incorporated within an IAMI 265 such as a special-purpose virtual machine that runs alongside guest virtual machines such as GVM 244 at a virtualization host 250 which has an attached hardware accelerator 277. The driver 222 may comprise at least an accelerator lifecycle event initiator 223, a guest-accessible interface configuration manager 224, and an accelerator monitor and metrics collector 225 in the depicted embodiment. The driver may comprise one or more user-mode processes or threads within the IAMI in various embodiments. As part of the initialization or configuration of the IAMI, a secure communication channel 281 may be established between the IAMI 265 and a virtualization management component (VMC) 267, such as a hypervisor, run at the virtualization host 250 in the depicted embodiment. In some implementations, for example, the secure communication channel may utilize a bi-directional notification or interrupt mechanism using a shared memory-mapped region.

A VMC may use the secure channel to issue commands or requests pertaining to the configuration of the hardware accelerator 277 in the depicted embodiment. In response to the VMC-issued commands or requests, the components of the IAMI may perform various tasks using the management interface 261, and provide the results of the tasks to the VMC. For example, accelerator lifecycle event initiator 223 may initialize or activate the hardware accelerator, terminate or deactivate the hardware accelerator, and/or perform state cleanup operations such as scrubbing internal memory of the hardware accelerator. One or more guest-accessible interfaces 262 which can be utilized by the guest virtual machine after the accelerator has been activated may be created or configured by the guest-accessible interface configuration manager 224 in response to a command from the VMC (or as part of the response to a command to initialize/activate the accelerator) in at least some embodiments. Applications 245 running at the GVM may generate tasks to be performed at the accelerator, and lower-level components at the GVM (e.g., an additional driver for the accelerator, which may be incorporated within the operating system 246 of the GVM) may pass on the task requests to the accelerator via a guest-accessible interface 262. The accelerator monitor may keep track of various operational indicators of the accelerator, such as temperature, utilization levels of subcomponents such as local processors and memory of the accelerator, the number of GVM-requested tasks performed at the accelerator, and so on, and provide the metrics to the VMC 267 via the secure communication channel. In at least some embodiments, the accelerator monitor may raise an alarm at the VMC if one or more of the accelerator's operational indicators meet threshold criteria. In response to some such alarms, the VMC may cause a GVM 244 which was utilizing the accelerator to pause its operations or exit, and then attempt to reset the state of the accelerator using the accelerator lifecycle event initiator. In at least some embodiments in which the IAMI is implemented as a special purpose virtual machine, a stripped-down machine image may be utilized for the IAMI, from which subcomponents that are typically included in GVMs but are not required for accelerator configuration operations are removed. Various devices that are typically emulated for GVMs may not be emulated for an IAMI virtual machine. In at least some embodiments, the IAMI may be configured in such a way that it cannot communicate via network connections, and cannot access persistent storage devices. The IAMI may have no access to several types of virtualization host resources such as memory utilized by the VMCs (for the VMCs' own operations, as well as memory allocated for GVMs) in the depicted embodiment.

In some embodiments, a hardware accelerator 277 may be attached to the primary processors of the virtualization host 250 via PCIe, and the guest-accessible interface 262 may comprise an SR-IOV interface such as a virtual function (VF). At the time that the virtualization host itself is booted, a VMC may enumerate the set of accelerators 277 attached to the host in the depicted embodiment, and send a list of the on-host accelerators to the VCS control plane, where the list may be incorporated into an inventory of accelerators and the virtualization hosts to which the accelerators are attached (e.g., part of the metadata repository 175 shown in FIG. 1). When a request for a GVM with access to a hardware accelerator 277 is received at the VCS control plane, the inventory may be used to select a particular virtualization host such as virtualization host 250 to run the requested GVM. AN internal GVM launch request may be sent from the VCS control plane to a VMC at the selected virtualization host. In some embodiments, the IAMI may be launched or spawned by the VMC, prior to the launch of the GVM itself, and an SR-IOV physical function (PF) representing the accelerator may be programmatically attached to the IAMI. The driver 222 of IAMI may detect the PF in such an embodiment, initialize the PF and spawn or configure one or more virtual functions (VFs) (the guest-accessible interfaces) associated with the PF. Once the VFs are configured successfully, the IAMI may notify the VMC that the accelerator has been successfully initialized. The VMC may then change configuration settings of the to-be-launched GVM (e.g., by altering Bus:Device.Function or BDF settings for the accelerator to point to the address of a VF) and launch the GVM. The GVM may then be launched, and task requests generated at the GVM's applications may be passed on for execution to the accelerator using the VF in at least some embodiments. Responses to the task requests, such as results obtained at the accelerator, may be obtained via the guest-accessible interface at the GVM in at least some embodiments as well. Note that VFs or other SR-IOV interfaces may not be used in some embodiments.

Figure 3:
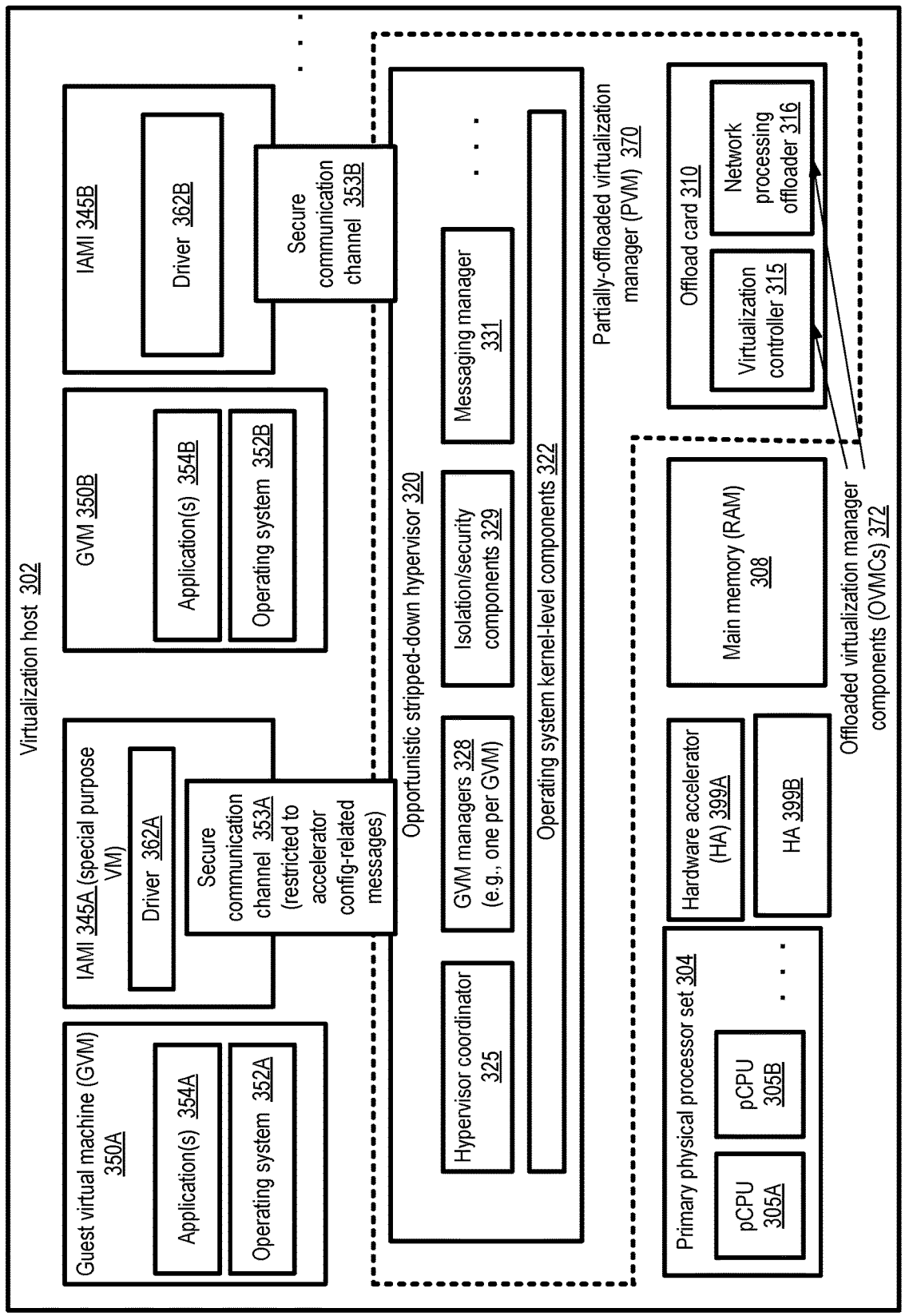
FIG. 3 illustrates a virtualization host comprising a partially-offloaded virtualization manager and a set of isolated accelerator management intermediaries, according to at least some embodiments.

In some embodiments, instead of executing all the virtualization management components of a virtualization host at the primary processors of the host, some virtualization functionality may be offloaded to a hardware card (which may also be attached via a peripheral interface such as PCIe). FIG. 3 illustrates a virtualization host comprising a partially-offloaded virtualization manager and a set of isolated accelerator management intermediaries, according to at least some embodiments. As shown, a virtualization host 302 may comprise a primary physical processor set 304, a main memory (e.g., one or more modules of random access memory or RAM) 308, a pair of hardware accelerators (HAs) 399A and 399B, a partially-offloaded virtualization manager (PVM) 370, guest virtual machines GVMs 350 such as GVMs 350A and 350B, and isolated accelerator management intermediaries (IAMIs) 345 such as IAMIs 345A and 345B. Each of the IAMIs may be used to perform accelerator-related configuration operations for a particular hardware accelerator on behalf of a respective GVM in the depicted embodiment—e.g., IAMI 345A may be used for configuration operations of accelerator 399A on behalf of GVM 350A, and IAMI 345B may be used for configuration operations of accelerator 399B on behalf of GVM 350B. Each IAMI may comprise a respective driver 362 (e.g., driver 362A of IAMI 345A, and driver 362B of IAMI 345B) which can access a management interface of the corresponding accelerator 399, and each IAMI may communicate with the PVM via a respective secure communication channel 353 such as channel 353A or 353B. The secure communication channel may only be used for acceleration configuration-related messages in the depicted embodiment. One or more subcomponents of PVM 370 may perform the kinds of accelerator-related operations described as being performed by VMC 267 of FIG. 2 in the embodiment depicted in FIG. 3—e.g., ensuring that an IAMI is operational before launching a GVM, causing the IAMI to configure a guest-accessible interface for the GVM, and so on.

Virtualization host 302 may also comprise a number of other components, e.g., various persistent storage devices, which are not shown in FIG. 3 to avoid clutter. The primary physical processor set 304 may comprise a number of physical CPUs (pCPUs), including pCPUs 305A-305B in the depicted embodiment. Virtualized versions of the pCPUs, called vCPUs or virtual CPUs, may be allocated to individual GVMs by the PVM 370 during the lifetime of the GVMs. Each GVM 350 may comprise a respective instance of an operation system (e.g., operating systems 352A-352B) and a set of applications (e.g., 354A-354C) being run on behalf of clients of the virtualized computing service, at least some of which may utilize the accelerator 399 to run tasks.

The PVM 370 may comprise an opportunistic stripped-down hypervisor 320 (which uses the pCPUs) and one or more offloaded virtualization manager components (OVMCs) 372 which do not use the pCPUs in the depicted embodiment. OVMCs 372 may include, for example, a virtualization controller 315 and a network processing offloader 316. Individual ones of the OVMCs may be implemented using a respective system-on-chip design in some embodiments. Although both OVMCs 372 are shown as being incorporated within a single offload card 310 (e.g., a PCIe card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 315 and the network processing offloader 316. The virtualization controller, as suggested by its name, may be responsible for organizing or orchestrating much of the virtualization management work performed at the host 302 in the depicted embodiment—e.g., it may be the first of the components of the PVM to boot, trigger the launches of the other components of the PVM, communicate with the VCS control plane, make memory allocation decisions with respect to guest virtual machines, and so on. The network processing offloader 316 may be responsible for implementing one or more networking protocols (including for example an encapsulation protocol used within the VCS) and acting as an intermediary between the GVMs and networking endpoints outside the virtualization host in the depicted embodiment.

Hypervisor 320 may be described as being stripped-down in the depicted embodiment because much of the work performed by at least some conventional hypervisors may be handled by the OVMCs 372 instead, thereby reducing the complexity and size of the hypervisor 320. In addition, hypervisor 320 may be designated as opportunistic because, under most circumstances, it may wait until a GVM voluntarily relinquishes control of a pCPU 305 before the hypervisor uses CPU cycles. Thus, for example, when a particular GVM 350 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the GVM is not expecting to use the pCPU. As such, the hypervisor 320 may have a minimal impact on the performance of applications 354 in the depicted embodiment.

The hypervisor 320 may itself comprise a number of subcomponents in the depicted embodiment, including a set of operating system kernel-level components 322, a hypervisor coordinator 325, one or more GVM managers 328, isolation/security components 329, and/or a messaging manager 331. The hypervisor coordinator 325, individual ones of the GVM managers 328, the isolation/security components 329 and/or the messaging manager 331 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by GVMs, etc.). In some implementations, for example, several of the hypervisor subcomponents may typically remain blocked on a polling system call (such as epoll( ) or the equivalent) most of the time.

The kernel-level components 322 may provide support for various low-level operations such as the initial responses to VM exit instructions issued by the GVMs (e.g., when a GVM gives up a pCPU). The hypervisor coordinator 325, as implied by the name, may be responsible for orchestrating operations of the other subcomponents. The hypervisor coordinator 325 may, for example, implement an API which can be used for communications between the OVMCs 372 and the hypervisor, initiating GVM launches and terminations (e.g., at the request of an OVMC which has received a request from the VCS control plane for launching or terminating a GVM), exposing metrics collected by the GVM managers, providing debugging capabilities, and so on.

Each GVM manager 328 may be responsible for launching or instantiating a respective GVM based on a specification provided by the coordinator 325, monitoring metrics and logs of the GVM, and so on. In some embodiments a GVM manager 328 may also help with GVM-requested I/O operations for certain devices, e.g., by trapping GVM I/O requests and translating them to memory-mapped I/O operations completed with the help of an OVMC. In at least some embodiments, in accordance with the security-related principle of least privilege, a GVM manager 328 may drop many of its own privileges as soon as possible during the instantiation of a GVM. For example, after one or more vPCU (virtual CPU) threads have been spawned for a GVM, and the GVM's memory has been mapped, the GVM manager may disable some of its privileges to reduce the opportunity for security breaches. In one embodiment, a GVM manager 328 may check whether random samples of GVM memory are zeroed as expected (instead of checking the entire GVM memory at one time), thereby increasing the speed of bringing up GVMs. In some embodiments there may be a 1-to-1 mapping between GVM managers and GVMs, while in other embodiments a single GVM manager may be responsible for multiple GVMs.

The messaging manager 331 may act as an intermediary between the virtualization controller 315 and the hypervisor, e.g., by translating commands issued using a queue-based protocol by the virtualization controller into pipe messages within the hypervisor. In some embodiments, the messaging manager may coordinate communications with the IAMIs via channels 353. The security and isolation components 329 may be responsible, for example, for scrubbing or cleaning up GVM memory when a GVM terminates, so that inadvertent sharing of data across GVMs can be avoided. In one embodiment, the security and isolation components may also be responsible for initiating (via the IAMIs) cleanup operations with respect to internal memory of the hardware accelerators as well. It is noted that the PVM may comprise additional components (not shown in FIG. 3) in at least some embodiments, while in at least one embodiment one or more of the PVM components shown in FIG. 3 may not be required.

Figure 4:
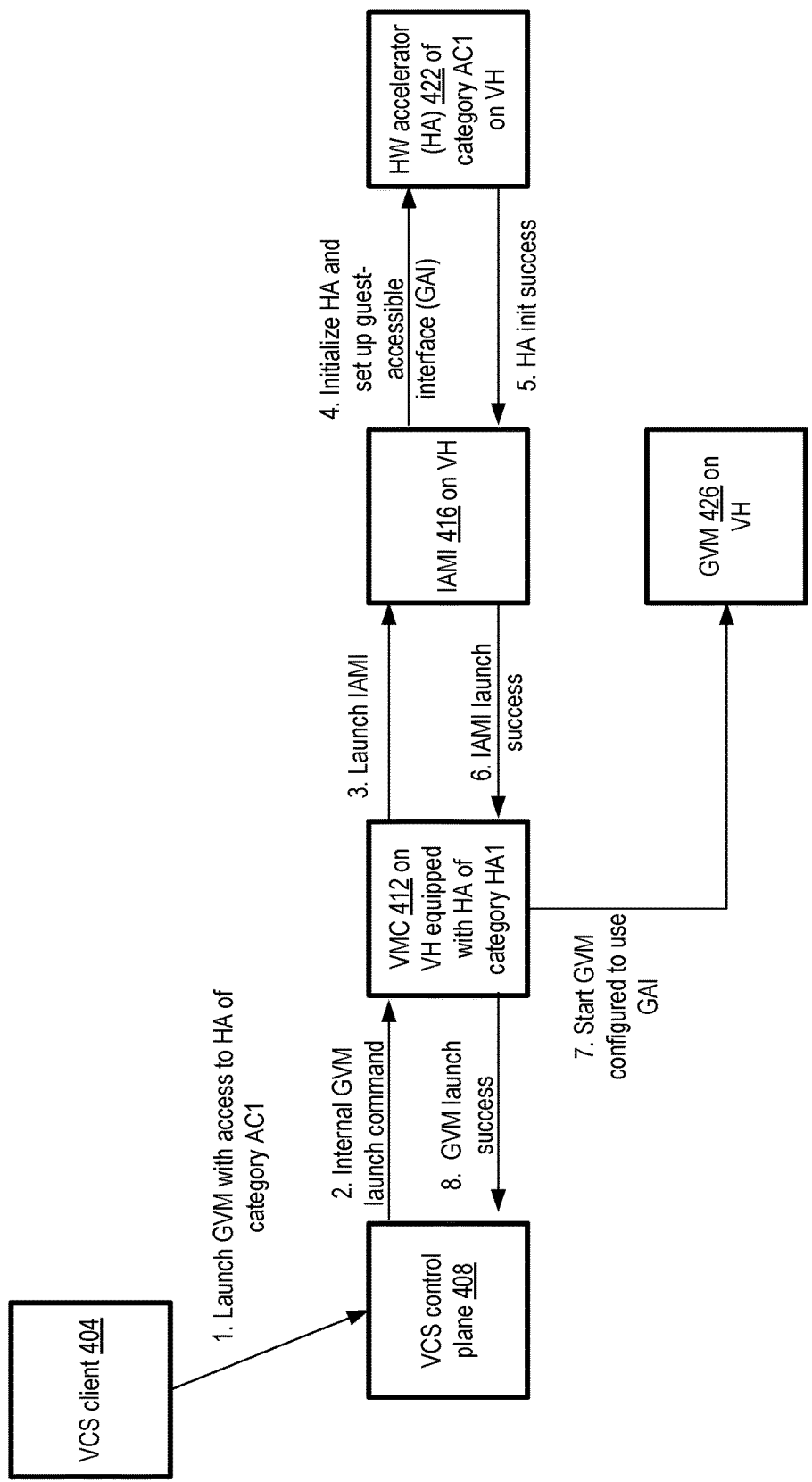
FIG. 4 illustrates an overview of an example workflow for launching a guest virtual machine which is provided access to a hardware accelerator, according to at least some embodiments.

FIG. 4 illustrates an overview of an example workflow for launching a guest virtual machine which is provided access to a hardware accelerator, according to at least some embodiments. A VCS client 404 may submit a request, via a VCS control plane interface, to launch a GVM with access to a hardware accelerator HA of a particular category AC1 in the depicted embodiment, as indicated by the arrow labeled 1. Upon receiving the request from the client, the VCS control plane 408 may select a particular VH equipped with an accelerator of category AC1 to host the requested GVM.

In the embodiments shown in FIG. 4 and FIG. 5, a 1:1:1 relationship may be assumed to exist between GVMs, IAMIs and hardware accelerators, although other relationships may be supported in different embodiments as discussed in further detail below. Thus, each GVM may be assigned exclusive use of a hardware accelerator in the example scenario shown in FIG. 4, and an IAMI may be launched for each [GVM, HA] combination.

As indicated by the arrow labeled 2, an internal version of a GVM launch command may be sent from the VCS control plane to a VMC 412 such as a hypervisor on the selected VH. The VMC may launch or instantiate a new IAMI 416 at the VH, as indicated by the arrow labeled 3, before the requested GVM is itself instantiated. In some embodiments, as soon as the IAMI is launched, the IAMI may send a command or commands to initialize the HA 422 with which it is associated (arrow 4) via a management interface exposed by the HA. If there are multiple HAs at the VH, the VMC may provide an indication, when starting up the IAMI, of which specific HA the IAMI is to initialize in one embodiment. In other embodiments, the VMC may transmit a command to an IAMI after the IAMI becomes operational, requesting a set of configuration operations including initialization of the HA 422 on behalf of the yet-to-be-launched GVM. Initialization of the state of the HA 422 may include, among other actions, zeroing out or scrubbing internal memory of the HA in some embodiments, so that any residual data from a previous use of the HA (if the HA had for example been used for performing tasks requested from a different GVM earlier) is completely erased.

Prior to the instantiation of the GVM, in various embodiments, a guest-accessible interface (GAI) (such as an SR-IOV VF or PF) for use by the GVM may be created or configured by the IAMI in the depicted embodiment. After the initialization of the accelerator succeeds and the GAI has been successfully created (arrow 5), the IAMI may notify the VMC 412 that the launch of the IAMI was successful (arrow 6) in the depicted embodiment. At this point the VMC may have confirmation that the accelerator-related prerequisites for the GVM launch have been completed, so the VMC may instantiate the GVM 426 as indicated by arrow 7. In at least some embodiments, in order to enable the GVM to use the accelerator, a set of configuration changes may be made to the machine image used for the GVM, or to a configuration data set accessible from the GVM, by the VMC in various embodiments. Such a configuration change may provide information to the GVM about the GAI set up earlier in the workflow, e.g., by updating data structures used to access PCIe devices from the GVM. In some embodiments, a message may be sent from the VMC to the VCS control plane, as indicated by arrow 8, confirming that the GVM was launched successfully.

Figure 5:
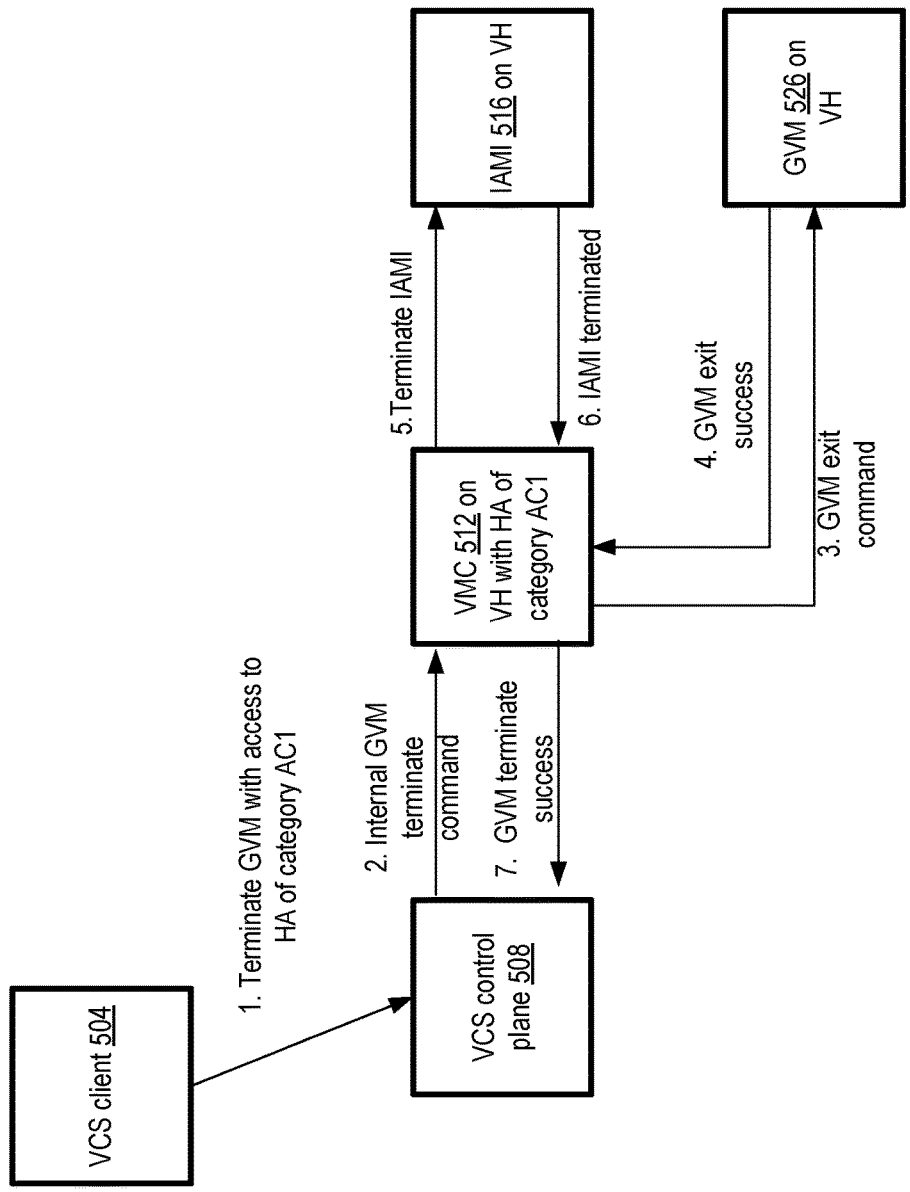
FIG. 5 illustrates an overview of an example workflow for terminating a guest virtual machine which was provided access a hardware accelerator, according to at least some embodiments.

FIG. 5 illustrates an overview of an example workflow for terminating a guest virtual machine which was provided access a hardware accelerator, according to at least some embodiments. A VCS client 504 may submit a programmatic request (represented by the arrow labeled 1 in FIG. 5) to the VCS control plane 508 to terminate a GVM 526 in the depicted embodiment, e.g., after a set of applications for which the GVM was launched have been run.

An internal GVM terminate command may be sent from the VCS control plane 508 to a VMC 512 on the VH (equipped with an HA of category AC1) at which the GVM was running, as indicated by arrow 2. Because of the 1:1 relationship between the GVM and its IAMI, the VMC may have to terminate both the IAMI 516 which was launched for the GVM 526, as well as the GVM 526 itself in the depicted embodiment. The GVM may be terminated prior to the IAMI in at least some implementations, because terminating the IAMI before the GVM may result in scenarios in which the GVM attempts to send task requests to the HA after the guest-accessible interface has been disabled or the HA itself has been disabled during the termination of the IAMI.

The VMC may send a command to exit execution to the GVM 526, as indicated by arrow 3. After the GVM exits and can no longer send tasks to the HA assigned earlier to the GVM, a GVM exit success indicator may be obtained by the VMC (arrow 4). The VMC may then send a command or request to terminate the IAMI (arrow 5). The IAMI in turn may disable or de-configure the HA as well as the guest-accessible interface it had created earlier in some embodiments, and the VMC may obtain an indication (arrow 6) that the IAMI is no longer operational. An indication that the GVM is no longer running (i.e., that the GVM has terminated successfully) may be provided to the VCS control plane from the VMC in some embodiments (arrow 7). Note that workflows other than those shown in FIG. 4 and/or FIG. 5 may be employed for launching/terminating a GVM with access to an HA in some embodiments.

Figure 6:
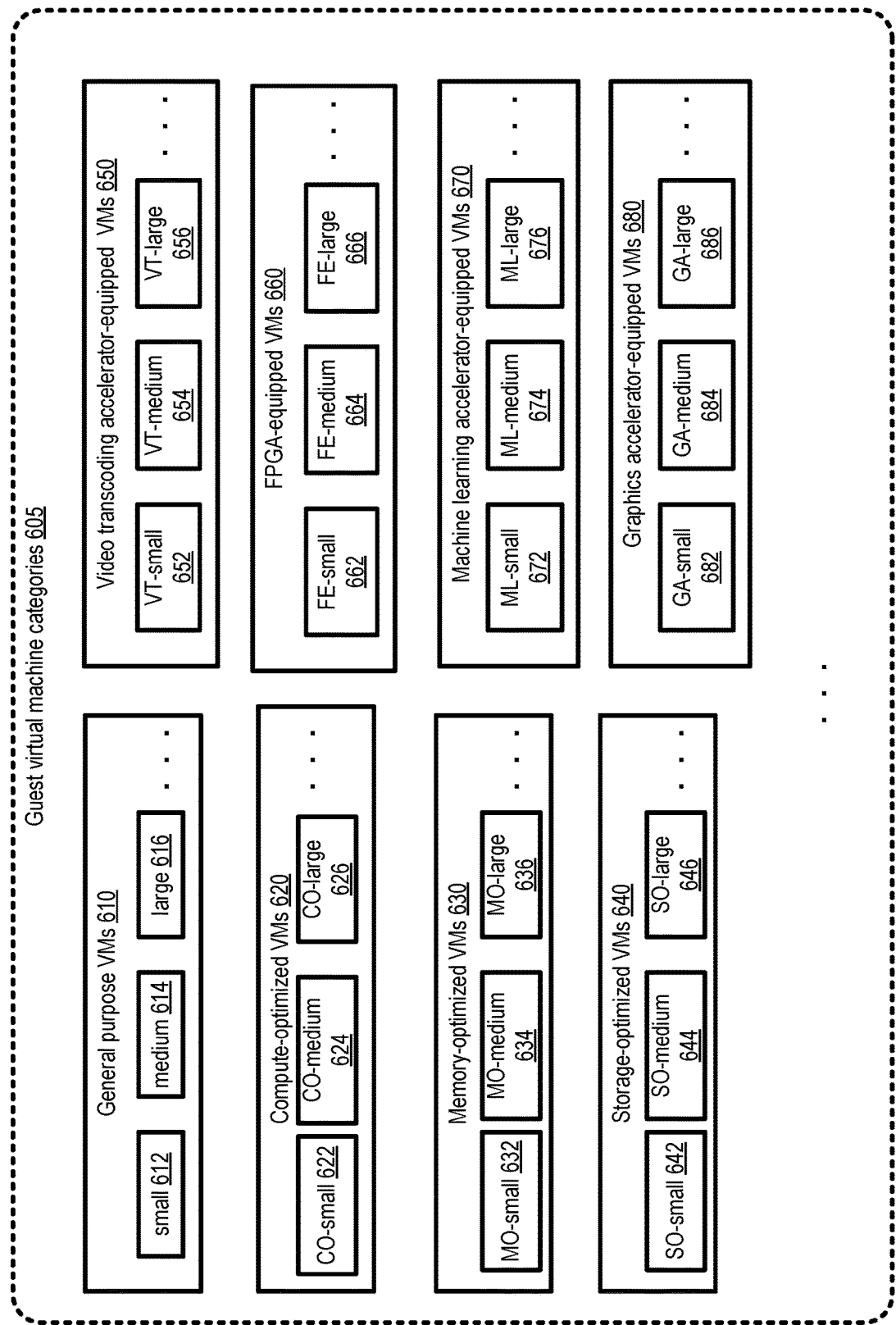
FIG. 6 illustrates example categories of guest virtual machines that may be instantiated on behalf of clients of a virtualized computing service, according to at least some embodiments.

FIG. 6 illustrates example categories of guest virtual machines that may be instantiated on behalf of clients of a virtualized computing service, according to at least some embodiments. When requesting the instantiation of one or more guest virtual machines, a VCS client may select from among the standardized guest virtual machine categories 605 defined by the VCS in the depicted embodiment.

The standardized set of virtual machine categories may be grouped into families of related VMs, such as a general-purpose VMs family 610, a compute-optimized VMs family 620, a memory-optimized VMs category 630, a storage-optimized VMs family 640, a video-transcoding accelerator-equipped VMs family 650, an FPGA-equipped VMs family 660, a machine learning accelerator-equipped VMs family 670, a graphics accelerator VMs equipped family 680 and so on in some embodiments. Depending on the estimated needs of the application(s) for which a given VM is to be used by the client, a VM type from the appropriate family may be selected. The relative resource capabilities for the different VM types may be expressed using units selected or defined by the VCS—e.g., for computing, units such as virtual CPUs that are roughly performance-equivalent to a particular well known processor running at a particular clock speed may be defined. The family may be selected based on qualitative considerations (e.g., is the application mix more memory-intensive or more compute-intensive?), while the particular VM type within the family (e.g., small 612 vs. medium 614 vs. large 616 in the general purpose family) may be selected based on considerations such as desired performance levels, cost, and so on. Compute-optimized VMs 620, such as CO-small VMs 622, CO-medium VMs 624, or CO-large VMs 626 may, for example, be implemented using hosts with more and/or faster processors or cores than the general purpose VMs in the depicted embodiment. In the memory-optimized VMs 630 such as MO-small VMs 632, MO-medium VMs 634, or MO-large VMs 636, the amount of memory (e.g., the number of gigabytes of memory per virtual CPU) relative to the computing capability may be higher than in compute-optimized VMs 620 or the general-purpose VMs. Similarly, in the storage optimized family 640 comprising SO-small VMs 642, SO-medium VMs 644, and SO-large VMs 646, the ratio of local storage to compute power (e.g., number of gigabytes of local solid-state device (SSD) storage per virtual CPU) may be higher than in the other families.

GVM categories within a given accelerator-equipped family may differ from one another in the number, vendor, and/or aggregate performance capabilities with respect to accelerated operations. For example, a VT-small GVM 652 may have access to a single video transcoding accelerator from a particular vendor, VT-medium GVM 654 may have access to four such accelerators, while a VT-large GVM 656 may have access to sixteen such accelerators. An FE-small GCM 662 may be able to utilize a particular FPGA from one FPGE vendor, an FE-medium GVM 664 may be able to utilize a pair of FPGAs from a different vendor, and an FE-large GVM 666 may be able to utilize four FPGAs from a third vendor in some embodiments. Similarly, the number of machine learning-optimized accelerators, the aggregate capacity for performing machine learning computations such as training epochs on input data sets of a given size using a given deep learning algorithm, and/or capacity for other machine learning tasks may increase from an ML-small GVM 672 to an ML-medium GVM 674 to an ML-large GCM 676. GA-small GVMs 682 may provide access to a single GPU, GA-medium GVMs 684 may provide twice the graphics operations per second capacity as GA-small GVMs using two or more GPUs, and GA-large GVMs 686 may provide twice the graphics operations per second capacity as the GA-medium GVMs 684 in some embodiments. In at least one embodiment, the VCS may also offer GVM categories which include accelerators of multiple categories—e.g., an accelerator optimized for video processing may be made accessible from the same GVM category as an FPGA or an accelerator optimized for scientific simulations. Note that in some cases, hardware accelerators (such as FPGAs accessible from FPGA-equipped VMs family 660) may themselves be adaptable/modifiable to perform various types of computations (such as video transcoding versus machine learning model training), and so it may be possible to utilize a given accelerator for applications addressing any of several problem domains. IAMIs of the kind introduced above may be utilized to help program or customize such flexible-purpose accelerators in at least some embodiments, e.g., with the specific problem domain being indicated by a VCS client. A VCS client may use a programmatic interface to indicate the specific kind of application or operation that is to be implemented using a flexible-purpose accelerator (e.g., as a parameter of a GVM launch request or a parameter of a separate request to prepare the accelerator) accessed from a GVM, and operations to customize the functionality of the accelerator for the application may be initiated by a VMC using an IAMI for the accelerator in such an embodiment.

Even though a wide range of resource capacities and functions may be covered by the different pre-defined or standardized GVM types, some clients may require GVMs whose combination of resource capabilities does not match well to any of the standardized types. Accordingly, in some embodiments, such clients may provide their own customized GVM specifications, indicating (in units interpretable by the VCS) their particular combinations of compute-power requirements, memory and storage requirements, networking requirements, accelerators and/or a set of additional optional properties. The optional properties may, for example, indicate an estimated lifetime (e.g., N minutes) of a requested GVM, an intended type of use of the GVM (e.g., for setting up software containers) and the like. In various embodiments, clients may use such customized specifications to select resource requirement combinations over wider, more "continuous" ranges than those chosen for standardized VMs. From the perspective of the VCS provider, enabling clients to specify VM requirements using such continuous ranges over different performance dimensions may have the additional benefit in various embodiments that it may become possible to increase hardware oversubscription levels (and/or overall hardware resource utilization levels) without affecting responsiveness. Given the same set of virtualization hosts, it may, depending on the mix of concurrent or near-concurrent GVM requests, be possible to "fit" more virtual machines in total on the set of hosts than would have been possible if only discrete standardized GVMs were supported. Upon receiving request for a customized GVM, in some embodiments the VCS may attempt to find a virtualization host which satisfies as many (preferably all) of the requirements in the client's request as possible, and inform the client if there are any differences in the capabilities of the virtualization host and the requirements of the client. If the client is satisfied with the capabilities of the virtualization host selected by the VCS, a flexible-configuration GVM may be launched at that host.

FIG. 7 and FIG. 8 collectively illustrate example configuration options for providing access to hardware accelerators at virtualization hosts using isolated accelerator management intermediaries, according to at least some embodiments. In configuration option A of FIG. 7, a given virtualization host 710 may have at most one hardware accelerator (HA) 760 of a category AC1, but multiple GVMs from which tasks are to be directed to that accelerator may be launched at that VH, and a respective IAMI may be launched corresponding to each GVM. Thus, IAMI 722A may be run at VH 710 to perform configuration operations with respect to the HA 760 on behalf of GVM 720A, while IAMI 722B may be run at VH 710 to perform configuration operations with respect to the HA 760 on behalf of GVM 720B. HA 760 may be used in multi-tenant or shared mode, and the IAMIs 722A and 722B may be configured in single-tenant mode in option A.

In configuration option B shown in FIG. 7, a VH 711 may comprise several HAs of the same category AC1, and each of the HAs may be made accessible to multiple GVMs. Thus, HA 760B and 760C may each be used for performing tasks requested from GVM 720C as well as tasks requested from GVM 720D. A respective IAMI may be configured for each GVM in option B: IAMI 722C for GVM 720C, and IAMI 722D for GVM 720D. As in configuration option A, the HAs in configuration option B may be utilized in multi-tenant mode, while IAMIs may be configured in single mode; the primary difference between configurations A and B is the number of HAs attached to the VH.

In configuration option C shown in FIG. 7, a VH 712 may also comprise several HAs of the same category AC1 (such as HAs, and each of the HAs may also be made accessible to multiple GVMs. A single multi-tenant IAMI may be configured for all the GVMs that are to access any of the HAs in option C. IAMI 722E may thus be used to perform the needed configuration operations for GVM 720E and well as GVM 720F.

In configuration option D shown in FIG. 8, a virtualization host 810 includes hardware accelerators of two different categories AC1 and AC2: AC1 HA 860, and AC2 HA 862. The HA of the two categories may differ in their providers or vendors, the types of operations that can be run or accelerated at the HA, performance capabilities, the kinds of metrics that can be extracted from the HAs, and/or various other properties in different embodiments. A given GVM may access HAs of either category, and a respective IAMI be use for each HA category for each GVM. Thus, IAMI 822A may be used for AC1 HA 860 for GVM 820A, IAMI 823A may be used for AC2 HA 862 for GVM 820A, IAMI 822B may be used for AC1 HA 860 for GVM 820B, and IAMI 823B may be used for AC2 HA 862 for GVM 820B.

In configuration option E shown in FIG. 8, VH 810 may also comprise hardware accelerators of two different categories AC1 and AC2: AC1 HA 863 and AC2 HA 864. IN this configuration option, a single IAMI may be established for a given GVM, regardless of the number or types of AC1 accessed by that GVM. Thus, IAMI 822C may be used to perform configuration operations for both HAs 863 and 864 on behalf of GVM 820C, while IAMI 822D may be utilized to perform configuration operations for both HAs on behalf of GVM 820D. Other configuration options may be supported in some embodiments than those illustrated in FIG. 8 or FIG. 9. The particular configuration option implemented at the VCS for a given set of HA categories may depend on a variety of factors—e.g., whether a vendor of an HA permits concurrent use of the HA for multiple requests from different GVMs, the complexity of the driver or other software which has to be included in an IAMI for a given HA category, expected demands for HAs of a specific pair of different categories from applications running on a single GVM, the extent to which synchronization is required between operations requested from different GVMs or operations performed at different HAs, the maximum number of GVMs expected to run at a given VH and require access to one or more accelerators, the resource utilizations of different IAMIs or HA drivers, and so on.

Figure 9:
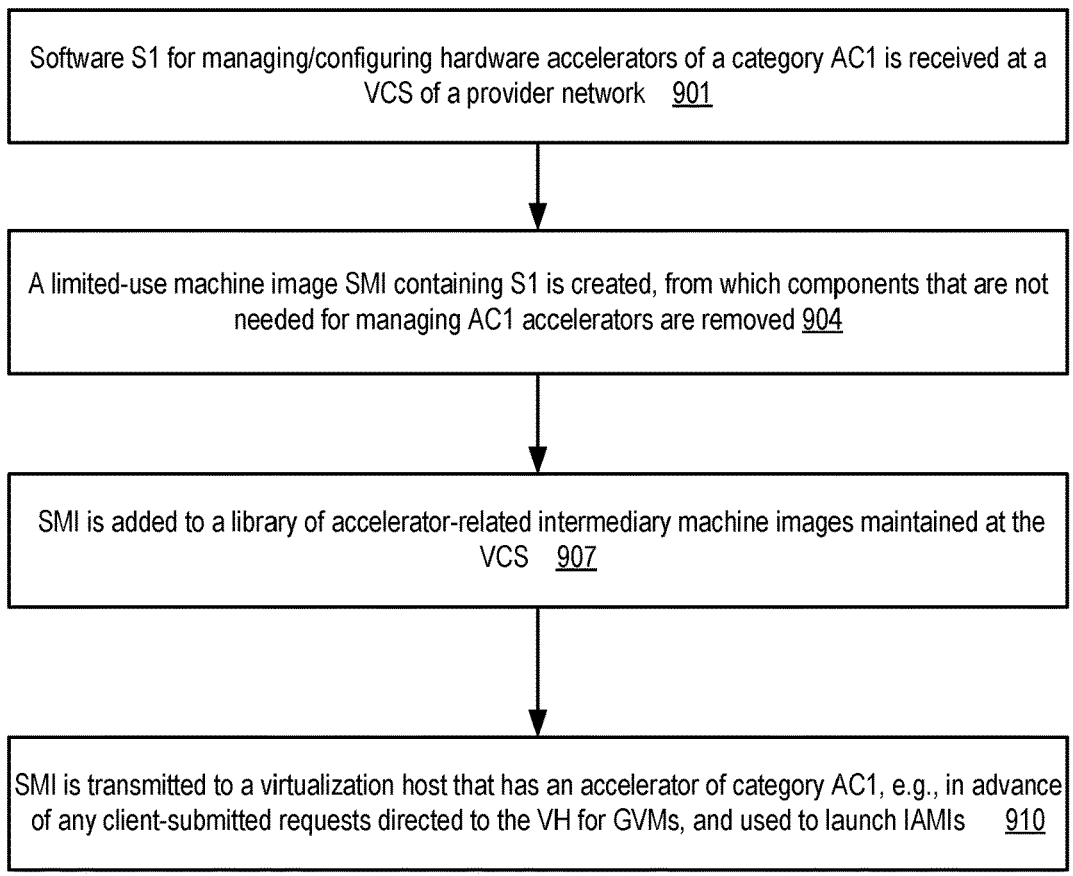
FIG. 9 is a flow diagram illustrating aspects of operations which may be performed to create and deploy a machine image for an isolated accelerator management intermediary, according to at least some embodiments.

FIG. 9 is a flow diagram illustrating aspects of operations which may be performed to create and deploy a machine image for an isolated accelerator management intermediary, according to at least some embodiments. As shown in element 901, a set of software S1 for managing/configuring hardware accelerators of a category AC1 (such as a driver which is written to invoke application programmatic interfaces of a management/administration interface to hardware accelerators of that category) may be received at a VCS (e.g., at a control plane server of the VCS) of a provider network via a programmatic interface. The software may be provided by a third-party vendor as part of a procedure for registering hardware accelerators at the VCS in at least some embodiments. S1 may be provided in executable form to the VCS, and/or in source code form.

A special-purpose or limited-use machine image SMI containing an executable version of S1 may be created at the VCS (element 904). The machine image may SMI be considered limited-use in that in contrast to machine images used for GVMs launched to run applications of VCS clients, the SMI may only comprise logic to perform a small number of tasks related to accelerator management: e.g., using the management interface of an accelerator to change the state of the accelerator, collect metrics and monitor operational conditions at the accelerator. Components that would normally be present in a GVM launched for a VCS customer, such as code and drivers to access various types of general-purpose I/O devices, or to transfer messages via standard protocols such as TCP/IP (Transmission Control Protocol/Internet Protocol) and the like may not be included in the SMI in at least some embodiments. Various I/O devices that are emulated by the virtualization management components for client-requested GVMs may not be emulated for virtual machine launched using an SMI in at least one embodiment.

The software S1 and the SMI may be tested thoroughly at the provider network in some embodiments to ensure that it meets various acceptability criteria. After verifying that S1 and SMI meet the criteria, in various embodiments SMI may be added to a library of accelerator-related intermediary machine images maintained at the VCS (element 907) in the depicted embodiment. The SMI may be transmitted to virtualization hosts that include accelerators of category AC1 in various embodiments (element 910). In some cases, SMIs may be transmitted in advance of requests from clients of the VCS for GVMs that can access AC1 accelerators, so that the time taken to launch such GVMs is reduced relative to scenarios in which SMIs have to be transmitted to the virtualization hosts after the client has requested a GVM. At the virtualization hosts, SMIs may be used to instantiate IAMIs in various embodiments.

FIG. 10 is a flow diagram illustrating aspects of operations which may be performed to launch a guest virtual machine at a virtualization host equipped with a hardware accelerator, according to at least some embodiments. As shown in element 1001, a programmatic request for a GVM (compute instance) with access to a hardware accelerator (HA) of an accelerator category AC1 may be received at a VCS similar in features to VCS 110 of FIG. 1 from a client. The client may, for example, specify a GVM category similar to the accelerator-equipped categories shown in FIG. 6 as one of the parameters of the programmatic request.

The VCS control plane may select a particular virtualization host VH1 which has an accelerator HA1 of category AC1, and send an internal request for a GVM launch to a virtualization management component VMC1 (such as a hypervisor) running at VH1 (element 1004) in various embodiments. VH1 may be selected from among numerous hosts that have AC1 HAs based on a variety of factors such as recent resource utilization metrics (including HA1 utilization metrics), proximity to other VHs at which GVMs of the same client are already running, and so on in the depicted embodiment.

VMC1 may verify, prior to launching the requested GVM, that an isolated accelerator intermediary associated with, or configured to perform configuration operations with respect to, HAs of category AC1 has been configured (e.g., is running) at VH1 in various embodiments (element 1007). In one implementation, for example, in which a 1:1 mapping is implemented between GVMs and IAMIs (as in configuration options A and B of FIG. 7), VMC1 may ensure that such an IAMI is running by launching a new IAMI using a special-purpose machine image of the kind discussed in the context of FIG. 9. The IAMI may comprise a user-mode process with permission to access and use a management interface exposed by HAs of category AC1, such as HA1 in the depicted embodiment. The IAMI may only communicate with VMC1 via a secure communication channel dedicated for accelerator management-related traffic, may not be able to access memory and/or other resources used by VMC1 for its virtualization-related tasks, and may not be able to access or memory and/or other resources (other than HA1) allocated to the GVMs run at VH1. In some embodiments, the IAMI may only be able to communicate with HA1 itself (using HA1's management interface) and with VMC1 (using the secure communication channel); communications via conventional network protocols, or via writes to persistent devices (other than any devices which may be used for the secure channel to VMC1), may be prohibited. The IAMI may thus not be permitted to communicate with GVMs at VH1 directly in at least some embodiments. Clients on whose behalf GVMs are launched at VH1 may not even be aware of the existence of the IAMI in various embodiments.

The IAMI may perform a set of operations needed to enable access from a GVM to HA1 using a guest-accessible interface of HA1 in various embodiments (element 1010). The set of operations may include, for example, initializing the internal state of HA1 and creating/spawning an SR-IOV virtual function (VF) associated with an SR-IOV physical function (PF) corresponding to HA1. In some embodiments, the IAMI may automatically perform the set of operations when the IAMI is started up; in other embodiments, the IAMI may also or instead perform the operations in response to a command or request issued by VMC1.

After VMC1 confirms that the IAMI has completed the set of operations successfully (e.g., based on a message received via the secure channel), VMC1 may launch the requested GVM, changing its configuration settings (e.g., PCIe BDF settings) if needed to enable the GVM to use the guest-accessible interface (element 1013). After the GVM starts up, requests for acceleration operations may be transmitted to HA1 from the GVM via the guest-accessible interface, and results of the operations may be received at the GVM via the guest-accessible interface in various embodiments (element 1016). The IAMI may collect various metrics of operations performed at HA1, and such metrics may be provided (e.g., via VMC1) to the client on whose behalf the GVM was launched.

It is noted that in various embodiments, some of the operations shown in the flow diagram of FIG. 9 and/or FIG. 10 may be implemented in a different order than that shown in the figure, or may be performed in parallel rather than sequentially. Additionally, some of the operations shown in FIG. 9 and/or FIG. 10 may not be required in one or more implementations.

Figure 11:
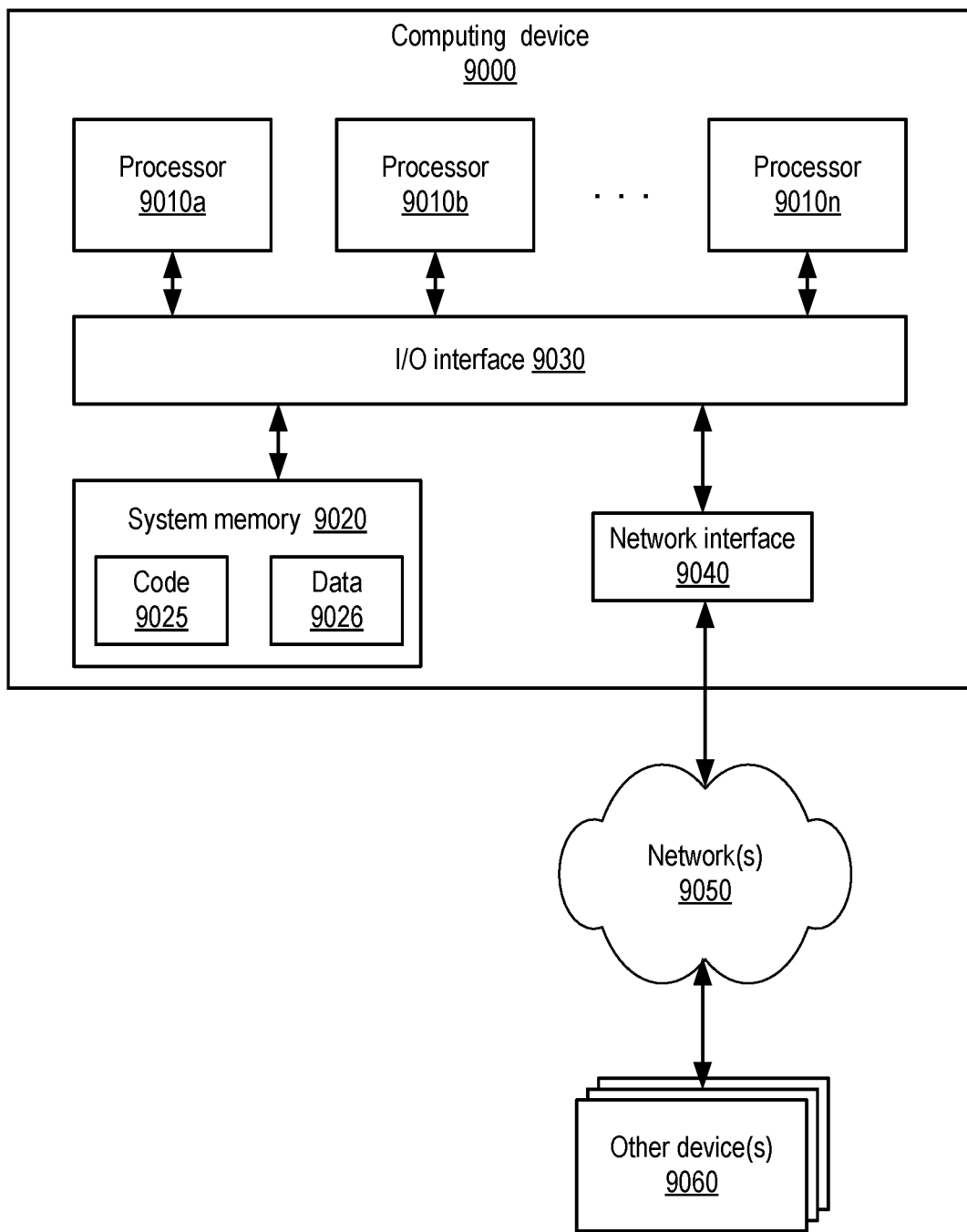
FIG. 11 is a block diagram illustrating an example computing device that may be used in at least some embodiments.

In at least some embodiments, a server that implements the types of techniques described herein (e.g., including VCS control plane functions and/or virtualization host functions), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a virtualized computing service; and
a hypervisor of a virtualization host of the virtualized computing service, wherein the virtualization host comprises a given hardware accelerator of a category of hardware accelerators;
wherein the control plane server is configured to, in response to receiving a programmatic request for a guest virtual machine with access to the given hardware accelerator of the category, transmit a launch request for a guest virtual machine to the virtualization host; and
wherein the hypervisor is configured to verify, prior to a launch of the guest virtual machine at the virtualization host in response to the launch request from the control plane server, that an isolated accelerator management intermediary associated with the given hardware accelerator of the category is running at the virtualization host;
wherein the isolated accelerator management intermediary comprises a user-mode process with permission to access a management interface exposed by the given hardware accelerator of the category, wherein the isolated accelerator management intermediary is configured to communicate with the hypervisor via a secure channel restricted to transmission of messages pertaining to accelerator management, wherein to isolate the isolated accelerator management intermediary from the hypervisor the isolated accelerator management intermediary lacks permission to access at least a portion of memory which is used by the hypervisor;
wherein the hypervisor is configured to:
cause the isolated accelerator management intermediary to perform, using the management interface exposed by the given hardware accelerator of the category, a set of operations to enable access to the given hardware accelerator of the category from the guest virtual machine, wherein the set of operations includes initializing the given hardware accelerator of the category and configuring a guest-accessible interface of the given hardware accelerator of the category; and
launch the guest virtual machine in response to determining via the secure channel that the set of operations has been completed, wherein the guest virtual machine uses the guest-accessible interface of the given hardware accelerator of the category to (a) submit a request for a task to the given hardware accelerator of the category and (b) obtain a result of the task from the given hardware accelerator of the category.

2. The system as recited in claim 1, wherein the given hardware accelerator of the category is attached to a primary processor of the virtualization host via a peripheral interconnect.

3. The system as recited in claim 1, wherein the given hardware accelerator of the category comprises one or more of: (a) a video transcoder, (b) a graphics processor, (c) an FPGA (field programmable gate array), or (d) a machine learning task processor.

4. The system as recited in claim 1, wherein the guest-accessible interface is a Single Root Input/Output Virtualization (SR-IOV) interface.

5. The system as recited in claim 1, wherein the hypervisor is further configured to:
launch, at the virtualization host, the isolated accelerator management intermediary in response to receiving the launch request for the guest virtual machine from the control plane server; and
launch, at the virtualization host, an additional isolated accelerator management intermediary in response to receiving a launch request for another guest virtual machine which is to access another hardware accelerator of the virtualization host.

6. A computer-implemented method, comprising:
performing, by a first isolated accelerator management intermediary running on a virtualization host which includes a virtualization management component, using a management interface exposed by a first hardware accelerator, a set of operations to enable access to the first hardware accelerator from a guest virtual machine, wherein the set of operations includes configuring a guest-accessible interface of the first hardware accelerator, wherein the first isolated accelerator management intermediary runs as a user-mode process and the virtualization management component is configured to restrict communications from the first isolated accelerator management intermediary to transmission of messages pertaining to accelerator management;

launching the guest virtual machine by the virtualization management component in response to receiving an indication that the set of operations has been completed; and obtaining, at the guest virtual machine via the guest-accessible interface, a result of a task performed at the first hardware accelerator.

7. The computer-implemented method as recited in claim 6, wherein
the first hardware accelerator is attached to a processor of the virtualization host via one of: (a) a PCIe (Peripheral Control Interface—Express) interconnect or (b) a Compute Express Link interconnect.

8. The computer-implemented method as recited in claim 6, wherein the guest-accessible interface comprises one or more virtual functions of a single-root input output virtualization interface (SR-IOV), the computer-implemented method further comprising:
causing, by the virtualization management component, an SR-IOV physical function, corresponding to the first hardware accelerator, to be accessed from the first isolated accelerator management intermediary; and
running, by the first isolated accelerator management intermediary, the one or more virtual functions, wherein the one or more virtual functions are mapped to the SR-IOV physical function.

9. The computer-implemented method as recited in claim 6, further comprising:
launching, at the virtualization host by the virtualization management component, the first isolated accelerator management intermediary in response to receiving a launch request for the guest virtual machine; and
launching, at the virtualization host by the virtualization management component, a second isolated accelerator management intermediary in response to receiving a launch request for another guest virtual machine which is to access the first hardware accelerator.

10. The computer-implemented method as recited in claim 6, wherein the first hardware accelerator belongs to a first category of accelerators which accelerate a first type of task, wherein the virtualization host comprises a second hardware accelerator of the first category, the computer-implemented method further comprising:
performing, by the first isolated accelerator management intermediary, using a management interface exposed by the second hardware accelerator, an additional set of operations to enable access to the second hardware accelerator from a guest virtual machine, wherein the additional set of operations includes configuring a guest-accessible interface of the second hardware accelerator.

11. The computer-implemented method as recited in claim 6, wherein the first hardware accelerator belongs to a first category of accelerators which accelerate a first type of task, wherein the virtualization host comprises a second hardware accelerator of a second category, wherein hardware accelerators of the second category accelerate a second type of task, the computer-implemented method further comprising:
performing, by a second isolated accelerator management intermediary running at the virtualization host, using a management interface exposed by the second hardware accelerator, an additional set of operations to enable access to the second hardware accelerator from a guest virtual machine, wherein the additional set of operations includes configuring a guest-accessible interface of the second hardware accelerator.

12. The computer-implemented method as recited in claim 6, wherein the first hardware accelerator belongs to a first category of accelerators which accelerate a first type of task, wherein the virtualization host comprises a second hardware accelerator of a second category, wherein hardware accelerators of the second category accelerate a second type of task, the computer-implemented method further comprising:
performing, by the first isolated accelerator management intermediary, using a management interface exposed by the second hardware accelerator, an additional set of operations to enable access to the second hardware accelerator from a guest virtual machine, wherein the additional set of operations includes configuring a guest-accessible interface of the second hardware accelerator.

13. The computer-implemented method as recited in claim 6, further comprising:
performing, by the first isolated accelerator management intermediary, using the management interface exposed by the first hardware accelerator, another set of operations to enable access to the first hardware accelerator from another guest virtual machine, wherein the other set of operations includes configuring another guest-accessible interface of the first hardware accelerator.

14. The computer-implemented method as recited in claim 6, wherein the virtualization host is part of a fleet of virtualization hosts of a virtualized computing service of a provider network, wherein the first isolated accelerator management intermediary comprises a software driver obtained at the provider network via a programmatic interface by a vendor of software for the first hardware accelerator.

15. The computer-implemented method as recited in claim 6, further comprising:
in response to receiving, by the virtualization management component, a request to terminate the guest virtual machine, causing the first isolated accelerator management intermediary to be terminated after verifying that the guest virtual machine is terminated.

16. A non-transitory computer-accessible storage medium storing program instructions that when executed on or across a processor:
perform, by an isolated accelerator management intermediary running at a virtualization host comprising a virtualization management component from which the isolated accelerator management intermediary is isolated, using a management interface exposed by a hardware accelerator, a set of operations to enable access to the hardware accelerator from a guest virtual machine, wherein the set of operations includes configuring a guest-accessible interface of the hardware accelerator, wherein the isolated accelerator management intermediary is configured to communicate with the virtualization management component via a secure channel restricted to transmission of messages pertaining to accelerator management;
determine, by a virtualization management component of the virtualization host, that the set of operations has been completed; and
launch the guest virtual machine by the virtualization management component in response to determining that the set of operations has been completed.

17. The non-transitory computer-accessible storage medium as recited in claim 16, wherein the hardware accelerator comprises one or more of: (a) a video processor, (b) a graphics processor, (c) an FPGA (field programmable gate array), or (d) a machine learning task processor.

18. The non-transitory computer-accessible storage medium as recited in claim 16, wherein the guest virtual machine is launched in response to a programmatic request from a client of a virtualized computing service, wherein the isolated accelerator management intermediary comprises a customized virtual machine which was not requested by the client, and wherein at least one device emulated by the virtualization management component for the guest virtual machine is not emulated by the virtualization management component for the isolated accelerator management intermediary.

19. The non-transitory computer-accessible storage medium as recited in claim 16, storing further program instructions that when executed on the processor:
  cause one or more metrics collected from the hardware accelerator by the isolated accelerator management intermediary to be presented via a programmatic interface.

20. The non-transitory computer-accessible storage medium as recited in claim 16, wherein the guest-accessible interface comprises a physical function (PF) single-root input/output virtualization (SR-IOV) interface.

* * * * *